United States Patent Office 2,882,259
Patented Apr. 14, 1959

2,882,259

SEGMENTED POLYMERS HAVING A LINEAR POLYMERIC BACKBONE WITH LINEAR POLYMER BRANCHES ATTACHED THERETO THROUGH UREIDO GROUPS AND PROCESS FOR PREPARING THE SAME

Roger K. Graham, Moorestown, N.J., assignor to Rohm & Haas Company, Philadelphia, Pa., a corporation of Delaware No Drawing. Application December 27, 1955
Serial No. 555,271

10 Claims. (Cl. 260—45.5)

This invention deals with segmented or segmentary polymers and with a method for their preparation. With particularity this method comprises bringing together in solution a copolymer containing pendant isocyanato groups and an amino-terminated polymer, specifically a styrene polymer having the —NH₂ group as the terminating group. The latter polymer is coupled to the former at the functional groups of the two polymers to form a novel kind of segmentary polymer having unusual and desirable properties.

It has been proposed that polyisocyanates be reacted with substances having a plurality of groups carrying reactive hydrogen, such as cellulose, alkyd resins, or wool. There results a cross-linked product which is insoluble and infusible. Such proposals of the prior art cannot lead to the kind of product which I have discovered. My product is a tough, thermoplastic, fusible copolymer which can be dissolved and which has new and remarkable properties.

The segmented polymers of my invention are prepared by joining chemically two different pre-formed polymers by means of two kinds of reactive functional groups. More specifically a soluble, fusible copolymer having a plurality of pendant isocyanato groups is reacted with a soluble polymer, particularly polystyrene, which is characterized by the presence of a terminal —NH₂ group on the polymer chain.

These two kinds of polymers are brought together in a dry, inert, volatile organic solvent for the two polymers. Suitable solvents include benzene, toluene, xylene, acetone, methyl ethyl ketone, and chloroform, and mixtures of such solvents, and other organic solvents, the solvents being chosen for solubility of the particular polymers selected for combination. Usually a concentration of about 5% to 20% by weight of the polymers in a solvent or mixture of solvents is used, although concentrations can be lower or somewhat higher. Too concentrated solutions may result in phase separation or gelling. The two polymers may be separately dissolved and their solutions brought together, or the two kinds of polymers may be dissolved in the same solvent medium.

The temperatures of the solutions may vary from about —20 C. up to the boiling point of the solvent, which may be as high as 150° C. The preferred temperature range is between 0° and 60° C. The rate of reaction of the two kinds of polymers is but little influenced by changes in temperature, since the energy of activation is relatively low.

A catalyst for effecting the reaction of the two types of groups is not necessary. In some cases, however, an inert base appears to help. For this purpose there may be used a tertiary amine, such as triethylamine, benzyldimethylamine, or dimethylaniline.

If desired, the reaction may be effected under an inert gas, such as nitrogen, to prevent possible discoloration. Pressure is not necessary, but may be used, if desired.

Theoretically, pressure may increase the rate of reaction.

As a copolymer supplying the isocyanato group, there may be used any addition copolymer having a plurality of pendant isocyanato groups along the polymer chain. This chain can be regarded as a backbone along which isocyanato groups are scattered. The backbone is formed by addition polymerization of polymerizable ethylenic compounds, particularly vinylidene compounds, at least one of which contains isocyanato groups. Copolymers of this type have already been reported in the art.

The most satisfactory addition polymers are prepared from vinyl ethers or from acrylic esters in which an isocyanatoalkyl group is present. For example, in U.S. Patent No. 2,727,020, there are described isocyanatoalkyl vinyl ethers and copolymers made from one or more of these ethers and at least one other polymerizable vinylidene compound free of reactive hydrogen, such as esters of acrylic or methacrylic acid, including alkyl, cycloalkyl, aralkyl, and related esters, a vinyl ester of a monocarboxylic, saturated acid, acrylonitrile, methacrylonitrile, N-substituted acrylamides and methacrylamides, these having, for example, N-hydrocarbon substituents or other substituents free of reactive hydrogen, styrene and substituted styrenes such as p-methylstyrene, p-chlorostyrene, or α-methylstyrene, other vinyl ethers, etc.

In U.S. Patent No. 2,718,516, there are described isocyanatoalkyl acrylates and methacrylates and polymers therefrom, including copolymers formed with other vinylidene compounds, such as recited above.

While it is best to use copolymers in which the isocyanato groups are present in an aliphatic branch of the polymer backbone, there can be used with less effectiveness polymers in which the isocyanato groups are carried by aromatic rings, as in copolymers of isocyanatostyrene and another polymerizable vinylidene compound. These act somewhat like the above discussed isocyanato-containing polymers, but differ therefrom in ease of reaction.

The copolymers having a plurality of pendant isocyanato groups can range in molecular weights from about 1,000 to 5,000,000 and preferably 10,000 to 1,000,000, since in this range the advantageous properties of the segmented polymers are most pronounced. The particular size is not of prime importance except that the copolymers be soluble. The molecular weights here shown represent number average values.

In the copolymers having pendant isocyanato groups, these groups are removed from the polymer backbone by at least two atoms. This position of these groups appears to render them more available and reactive than isocyanato groups held directly to the polymer chain, as would be the case where vinyl isocyanate is used as a comonomer. For this same reason, it is believed, the isocyanato groups are most effective and useful when present in the alcohol residue portion of an acrylic ester or in the isocyanatoalkyl portion of a vinyl ether.

A solution is made of a copolymer or of several copolymers carrying pendant isocyanato groups. Experience has shown that solutions containing $10^{-4}$ to $5 \times 10^{-1}$ gram moles per liter of the functional isocyanato group are preferred and the most convenient concentration of this functional group is at about $10^{-2}$ moles per liter. It is desirable to adjust the isocyanato group content of the copolymer to fall within these limits at total solids contents of about 5% to 20% in the solutions.

The amino-terminated styrene polymers are available through anionic polymerization in liquid ammonia. Higginson and Wooding, J. Chem. Soc. for 1952, pages 760, 774, and 1178, have shown that polymerization of styrene in liquid ammonia with alkali metal amides as initators produces polymer chains each of which has a terminal primary amine group on one end and an inert group (probably hydrogen) on the other. Sodium may also be used as initiator in liquid ammonia to give polymers which are chiefly amino-terminated.

In a typical preparation of an amino-terminated polystyrene, 100 parts by volume of anhydrous liquid ammonia is drawn from a tank, dried over sodium, and distilled into a vessel in which polymerization can be carried out. This vessel is equipped with a lead-in tube for ammonia, a tube for introducing oxygen or nitrogen gas, a device for introducing monomer, a reflux condenser cooled with solid carbon dioxide, a device for introducing sodium metal, and a stirrer. This vessel is maintained at −70° C. After the ammonia is distilled into this vessel, addition is made of freshly cut sodium in an amount of 0.27 part by weight. The system is stirred for about 30 minutes. Small measured amounts of oxygen are introduced to react with the sodium. As soon as the blue color fades, the temperature of the ammonia is raised until reflux takes place (−33° C.). There is slowly added styrene to a total of 41.5 parts by weight. Vigorous refluxing occurs as the styrene is added. Stirring is continued for three hours. Then ammonium chloride is added to destroy the catalyst. About 400 parts of dry methanol is then added and the ammonia evaporated. There results polymer in powdered form, which is filtered off, washed with methanol, and dissolved in toluene. The toluene solution is filtered and treated with methanol to precipitate the polymer. It is dried in an oven at 50° C.

A polymer thus prepared had an intrinsic viscosity of 0.20 deciliter/gram and a viscosity average molecular weight of 29,600. The number average molecular weight by titration of amine groups was 15,200. In general the molecular weight of the amino-terminated styrene polymers may range from 1,000 to 200,000 or more (number average) and is preferably 10,000 to 50,000.

In place of the amino-terminated polystyrene there may be used other polymers having but one amino group in a terminal position. Copolymers, based chiefly on methyl methacrylate, for example, may be prepared with such terminal groups, and also other copolymers. These generally require special methods for ensuring termination of polymer chains with amino groups. With methyl methacrylate and similar acrylic esters there may readily be obtained polymer chains terminated with a hydroxyl group, as by use of mercaptoethanol as a chain transfer agent. The hydroxyl group reacts with a diisocyanate, such as toluene diisocyanate, to give a free isocyanate group. This is in turn reacted with an alkylenediamine, such as ethylenediamine, in excess. Thus, each chain which originally had one hydroxyl group now has an amino group. Any free diisocyanate which may have been present is converted to a urea. The polymer and excess diamine are taken up in an organic solvent in which the urea is not readily soluble. The amino-terminated polymer can then be precipitated with an organic liquid in which polymer is not soluble. Other polymers may be handled in a similar way.

In the preparation of amino-terminated polystyrene there may be used a chain transfer agent, such as a mercapto-amine, typical of which are β-mercaptoethylamine or o-aminobenzenethiol, if this agent is carefully and freshly purified and the system is rigorously degassed.

Under these conditions, amino-terminated polystyrene and also polyvinyltoluene can be obtained. Either or both of these can be used to form segmented polymers. Other ring-substituted styrenes can likewise be polymerized to give amino-terminated chains.

According to the process of this invention at least one copolymer carrying pendant isocyanato groups is mixed with an amino-terminated polystyrene in solution in a dry, inert organic solvent. The mixture may be stirred, and reaction between the two kinds of functional groups is allowed to proceed over a period of 2 to about 100 or more hours. The progress of the reaction can be noted, if desired, by titration for free amine groups. When these have disappeared or have appreciably decreased, the new segmented polymer which has formed is worked up.

It is preferable, although not essential, to use a slight excess of isocyanato groups over amino groups in the mixture of polymers in solution. After reaction of the amino-terminated polymer, e.g. polystyrene, with copolymer carrying isocyanato groups, any excess of isocyanato groups can be destroyed by treating the reaction mixture with a primary or secondary amine, such as methylamine, dimethylamine, ethylamine, diethylamine, butylamine, tert-butyl amine, tert-octylamine, cyclohexylamine, benzylamine, aniline, N-methylaniline, pyrrolidine, piperidine, or morpholine. Such amine reacts with the remaining isocyanato groups and thereby deactivates them. Excess of such a primary or secondary amine can be left in the segmented polymer or it may be removed, as by extraction.

The segmented polymer which is formed can be isolated by evaporating the solvent. It can be precipitated from the solution in which it is formed by addition of another organic solvent which is a non-solvent for the segmented polymer. If desired, residual polystyrene and/or residual copolymer which originally carried the pendant isocyanato groups may be extracted. Cyclohexane or ethyl ether serves as useful differential polystyrene solvents for many combinations. To remove free copolymer, a solvent must be chosen for the particular copolymer used. For example, acetonitrile can be used to take out a copolymer based on methyl methacrylate and an isocyanatoalkyl acrylate or methacrylate or a vinyl isocyanatoalkyl ether.

Extraction is not, however, essential. On the one hand, nearly equivalent proportions of amine groups and of isocyanato groups can be taken, and the reaction of the polymers carrying these two kinds of groups can be allowed to go to practical completion. With high conversion there is little material left which could be extracted. On the other hand, for many purposes, a small proportion of one or both of the starting polymers in the presence of segmented polymer does not interfere with the practical application of the segmented polymer. Only when it is desired to have an especially pure segmented polymer is it necessary to apply extraction methods.

If the solvent solution of a segmented polymer is applied to a surface, films which are tough and durable can be formed. Thus, one use of this type of polymer is as a coating, for which purpose the solutions may be directly used. Similarly, the polymers may be isolated in the form of films or shreds, which may be further comminuted for use as molding powders.

A form suitable for molding can also be obtained by precipitating the segmented polymers in a granular form by addition of a non-solvent for the polymers to the solvent solution in which they were formed. The choice of non-solvent depends, of course, on the particular isocyanato-containing copolymer originally selected and the nature of the segmented polymer formed therefrom. The segmented polymer may be precipitated by addition of a lower alkanol, such as methanol, ethanol, or isopropyl alcohol, or a mixture of one or more of these with water. Water itself may sometimes be used. For some combinations naphthas can be used for precipitating the segmented polymer.

Another method for isolating segmented polymers is freeze-drying. In this method a solution of segmented polymer is chilled below its freezing point. The solvent is then sublimed under low pressure, leaving a fluffy powder. This is a particular useful form when it is desired to return the segmented polymer to solution.

The polymer which is formed has a backbone which is derived from the substantially linear addition copolymer having isocyanato groups. These groups are converted to ureido groups by the addition of the amino-terminated polymer. Thus, there are polymer chains appearing as branches which are joined to the backbone through ureido groups. Ordinarily the backbone is a linear addition polymer of vinylidene compounds having branched chains of polystyrene attached to the backbone through ureidophenyl or better, ureidoalkyl groups. The ureido group is bonded at one of its nitrogens to the alkyl group and at its other nitrogen to the polystyrene chain.

In the following examples parts are by weight unless otherwise designated. These examples are presented for purposes of illustration and not by way of limitation. Values for intrinsic viscosity, $[\eta]$ used below are in terms of deciliters per gram, in benzene at 30° C.

Example 1

To a reaction vessel which had been swept out with nitrogen there were introduced 10 parts of a copolymer (viscosity average mol. wt. 244,000, $[\eta]$ of 0.7) of methyl methacrylate and isocyanatoethyl methacrylate in a ratio of 195:5 supplying 1.43 milliequivalents of isocyanate, 11.6 parts of a polystyrene (mol. wt. 17,500 number average, $[\eta]$ of 0.197) having amine terminal groups amounting to 0.67 milliequivalent, and 220 parts of dry benzene. The mixture was agitated to complete solution and the solution was allowed to stand at 25°–30° C. for 80 hours. Analysis of the reaction mixture showed 91% of the amine groups had reacted. At this point about 0.1 part of tert-butylamine was added and the mixture was stirred for a half hour. This reaction mixture was poured into a 10-fold excess of methanol. Polymer was precipitated as a coarse powder, separated, and dried to give a product which was mostly the desired segmented polymer.

The resulting product was extracted with ethyl ether. From the ether there was obtained 0.7 part of polystyrene. The segmented polymer thus obtained was shown by ultraviolet analysis to have the calculated polystyrene units. It had an intrinsic viscosity of 1.31, which was higher than the intrinsic viscosity of either of the starting polymers.

The above procedure was followed with 5.9 parts of a copolymer of 98.5% of methyl methacrylate and 1.5% of β-isocyanatoethyl methacrylate (viscosity average mol. wt. 204,000, $[\eta]$ of 0.6) and 4.1 parts of a polystyrene (viscosity average mol. wt. 22,600, number average mol. wt. 12,300, $[\eta]$ of 0.169) in benzene. After 21 hours at 25° C. the reaction was 81% complete. The polymer was precipitated and extracted as above to give a segmented polymer having an intrinsic viscosity of 0.743.

Example 2

To a reaction vessel there were introduced 4.7 parts of a copolymer (mol. wt. 744,000 viscosity average, $[\eta]$ of 1.3) of butyl methacrylate and isocyanatoisobutyl methacrylate in a proportion supplying 0.49 milliequivalent in the parts used, 4.7 parts of a polystyrene (mol. wt. 28,700 viscosity average, $[\eta]$ of 0.2) having terminating amino groups supplying 0.31 milliequivalent, and 44 parts of dry benzene. This mixture was stirred at about 30°–35° C. for 83 hours. Remaining isocyanate groups were reacted with 0.4 part of tert-ocytlamine. Methanol was then added to the solution to precipitate the segmented polymer. The polymer was filtered off, washed with methanol, and dried in an oven at 60° C. under reduced pressure.

The polymer was analyzed and found to contain 1.1 parts of unattached polystyrene. The rest of the polymer was the segmented polymer. It was subjected to study by a dilatometric technique to determine the glass temperatures thereof, $T_g$, also known as the second order transition temperatures. Whereas polystyrene has a $T_g$ value of 100° C. and poly(butyl methacrylate) has a $T_g$ value of +16° C., the segmented polymer here formed has two distinct $T_g$ values, one at +64° and the other at —2° C. A copolymer of styrene and butyl methacrylate (1:1) has a single $T_g$ value of +55° C. This segmented polymer has high impact strength, good tensile strength, a relatively constant and moderately high modulus, this being a unique property distinguishing this class of polymers from ordinary glassy or rubbery homopolymers or copolymers, stability under load up to the higher $T_g$, and an increase in flexibility without any marked decrease in softening point. These advantages hold generally for the segmented polymers of this invention.

Example 3

The method used above was followed with two parts of a copolymer (viscosity average mol. wt. 13,000) of acrylonitrile and β-isocyanatoethyl methacrylate, the latter providing 3.3% of the copolymer, four parts of polystyrene (viscosity average mol. wt. 28,700) having amino terminal groups supplying 0.18 milliequivalent of —$NH_2$, and 100 parts of freshly distilled dimethylformamide. This mixture was stored for 50 hours and treated with 0.1 part of a tert-alkyl amine fraction having alkyl groups from about 8 to 12 carbon atoms. Polymer was precipitated by addition of methanol. The polymer was filtered off, washed and dried in an oven at 60° C. It was extracted with cyclohexane. There was thus separated 1.6 parts of polystyrene. The test and analytical data demonstrated that the product was a true segmented polymer. It was tough.

Example 4

By the same method there were reacted 2.1 parts of a copolymer (viscosity average mol. wt. 140,000, $[\eta]$ of 0.4) of dodecyl methacrylate and isocyanatoisobutyl methacrylate, and 4.0 parts of an amine-terminated polystyrene (viscosity average mol. wt. 29,600, no. average mol. wt. 15,200, $[\eta]$ of 0.2) in 43 parts of toluene. The copolymer supplied 0.18 milliequivalent of isocyanate and the polystyrene provided 0.15 milliequivalent of amino groups. The mixture was left at 25°–30° C. for 27 hours, at which time titration of an aliquot part showed 0.024 milliequivalent of amine remaining. The solution was treated with 0.1 part of tert-octylamine. Segmented polymer was precipitated by addition of methanol and separated. The marked increase in intrinsic viscosity (1.13) of the product coupled with the change in amine groups shows that a segmented polymer was formed.

Example 5

The reaction vessel was thoroughly dried and flushed with dry nitrogen. It was then charged with 3.0 parts of a copolymer (viscosity average mol. wt. 170,000, $[\eta]$ of 0.49) of butyl acrylate and β-isocyanatoethyl methacrylate supplying to the portion taken 0.31 milliequivalent of isocyanato groups, 3.3 parts of a polystyrene ($[\eta]$ of 0.2) with terminal —$NH_2$ groups supplying 0.17 milliequivalent of this group, and 75 parts of redistilled chloroform. This mixture was stored for 82 hours in a box at about 0° C. Titration at that time showed only 0.056 milliequivalent of amine remaining. The reaction mixture was treated with 0.2 part of tert-octylamine. The polymer content was precipitated with methanol and was separated and dried. The resulting product was found to be chiefly a segmented polymer, the solutions of which showed an increase in intrinsic viscosity (0.88). The dried polymer was tough and strong.

In a comparable way a copolymer from 89% 2-ethylhexyl acrylate and 11% of β-isocyanatoisobutyl vinyl ether (viscosity average mol. wt. 165,000) may be mixed in toluene with an amino-terminated polystyrene ($[\eta]$ of 0.2). The mixture is held at 60° C. for about 16 hours. The polymer resulting is precipitated with methanol and extracted with isopropyl ether. There results a tough segmented copolymer.

In place of the above vinyl ether there may be used any other of isocyanatoalkyl vinyl ethers shown in the art. In each case a segmented polymer results having the typical properties already described.

Example 6

In the same general way 0.5 part of a copolymer (viscosity average mol. wt. of 7,600) of styrene and 1% of β-isocyanatoethyl methacrylate supplying 0.18 milliequivalent to this amount of copolymer and 1.5 parts of a poly(methyl methacrylate) having polymer chains terminated with —NH₂ groups and supplying 0.18 milliequivalent of amine were dissolved in 25 parts of dry benzene. The mixture was left standing about 72 hours. Analysis at that time showed 23% of the amino groups had reacted. Nevertheless, 0.2 part of n-hexylamine was added. The mixture was then treated with ethanol to precipitate polymer. The precipitated and dried polymer was extracted to remove methyl methacrylate copolymer, there being thus extracted 0.67 part, leaving 1.3 parts of segmented polymer which was hard, yet tough.

In place of the above amino-terminated methyl methacrylate polymer there may be used a polystyrene or a polyvinyltoluene having the —NH₂ group as a terminating group of the polymer chains. The segmented polymers which result are hard and tough.

Example 7

In a similar way there are reacted in ethylene dichloride 25 parts of a copolymer (viscosity average mol. wt. 88,400) from vinyltoluene and 9.1% of isocyanatoethyl methacrylate and 15 parts of an amino-terminated polystyrene ($[\eta]$ of 0.2, viscosity average mol. wt. 29,600), there being 76 milliequivalents of NCO groups for 50 milliequivalents of amine groups. The mixture was heated to 84° C. for five hours. At the end of this time analysis showed the reaction was only 25% complete. Nevertheless, the polymer was precipitated and extracted to give a segmented polymer with an intrinsic viscosity of 0.62.

In this preparation as in others in which chlorinated hydrocarbons are used as solvents, the segmenting reaction is slower than in other kinds of solvents.

Example 8

There was prepared an amino-terminated polyvinyltoluene by a chain-transfer technique. For this purpose 23 parts of vinyltoluene was treated with 0.03 part of β-mercaptoethylamine and 0.01 part of azodiisobutyronitrile in a degassed reaction vessel. The mixture was maintained at about 60° C. for 12 hours. Polymer was precipitated with methanol and dried. From terminal amine groups the number average molecular weight was 37,000; $[\eta]$ was 0.76.

There were mixed six parts of the above vinyltoluene polymer and 8.5 parts of a copolymer of acrylonitrile and 3.3% of isocyanatoethyl methacrylate (viscosity average mol. wt. 13,000) in 200 parts of distilled dimethylformamide. This mixture was agitated at 25°–30° C. for 22 hours. The resulting polymer was precipitated with methanol and dried. It was extracted with cyclohexane to give a segmented polymer which was also tough and hard.

Example 9

To a dry flask flushed with nitrogen was charged 1.0 part of a copolymer (viscosity average molecular weight 57,600, $[\eta]=0.32$) of styrene and β-isocyanatoethyl methacrylate supplying to the portion taken 0.05 milliequivalent of isocyanato groups, 0.8 part of an amino-terminated polystyrene $[\eta]$ of 0.2) supplying 0.039 milliequivalent of this group, and 40 parts of dry benzene. The mixture was allowed to stand at 25°–30° C. for 24 hours. Analysis of the solution showed that 84% of the amine groups had reacted. The reaction mixture was treated with 0.1 part of n-hexylamine. The polymer was precipitated by pouring into methanol, separated, and dried.

The intrinsic viscosity of the branched polystyrene formed was 0.36. A linear polystyrene of the same number average molecular weight (66,800) would be expected to have an intrinsic viscosity of 0.48.

The segmented polymers which are prepared according to this invention are characterized by a useful and much-sought combination of properties. They have high impact strength when there is used a combination of a rubbery starting polymer and a glassy polymer. Over a considerable temperature range between the two glass temperatures there are exhibited the good form-stability of the glassy component plus the good impact resistance of the rubbery component. An ordinary copolymer of the same composition would possess either, but not both, a high impact strength or good form stability with a sharp transition at a temperature intermediate between the two Tg's. There is an increase in flexibility without decrease in softening point. Tensile strengths are good. In films or coatings there is no gross phase separation when films are laid down from solution. The segmented polymers exhibit considerable capacity for suspending or dissolving the lower molecular weight homopolymers or copolymers used in their preparation. Even in solution, including solution in petroleum products, the segmented polymers exhibit some unique properties, including viscosity, and solubility.

The segmented polymers are desirable in moldings or castings where flexibility and toughness are required. They can be used also as non-volatile, non-migrating plasticizers in other vinylidene polymers.

Segmented polymers as prepared by the method of this invention consist of a backbone from the original copolymer with the pendant isocyanato groups and of branches joined to the backbone through urea groups at the former sites of the isocyanato groups. Thus, the segmented polymers can be accurately described as being polymers in which there is a backbone formed by linear or substantially linear addition polymerization along which there are branches of polymers, chains, particularly polystyrene chains, attached to the said backbone through ureidoalkyl groups or through ureidophenyl groups.

I claim:

1. A process for preparing segmented copolymers which comprises bringing together and reacting in an organic solvent therefor between about —20° C. and about 150° C. (1) an organic solvent-soluble copolymer of a monovinylidene compound and a different polymerizable monovinylidene compound, said copolymer carrying a plurality of isocyanato groups on the copolymer molecule and (2) an organic solvent-soluble polymer of a monovinylidene compound, said polymer having polymeric molecules each of which is terminated by one basic —NH₂ amino group, the ratio of —NH₂ groups to isocyanato groups being from about 1:1 to about 1:2.

2. A segmented copolymer prepared according to the process of claim 1.

3. A process for preparing segmented copolymers which comprises bringing together and reacting in an organic solvent therefor between about —20° C. and 150° C. (1) an organic solvent-soluble copolymer of (a) a member of the class consisting of isocyanatoalkyl vinyl ethers, isocyanatoalkyl acrylates and isocyanatoalkyl methacrylates and a different polymerizable monovinylidene compound, said copolymer carrying a plurality of isocyanato groups, and (2) an organic solvent-soluble polymer of a member of the class consisting of styrene, vinyltoluene, and methyl methacrylate, said polymer having polymeric molecules each of which is terminated by one basic —NH₂ amino group, the ratio of —NH₂ groups to isocyanato groups being from about 1:1 to about 1:2.

4. A process for preparing segmented copolymers which comprises bringing together and reacting in an organic solvent therefor between about —20° C. and 150° C. (1) an organic solvent-soluble copolymer of (a) an isocyanatoalkyl methacrylate having two to four carbon atoms in the alkyl portion thereof and (b) a different polymerizable monovinylidene compound, said copolymer carrying a plurality of isocyanato groups, and (2) an organic solvent-soluble polymer of styrene, said polymer having polymeric molecules each terminated by one basic —$NH_2$ amino group, the ratio of —$NH_2$ groups to isocyanato groups being from about 1:1 to about 1:2.

5. A segmented copolymer prepared according to the process of claim 4.

6. A process for preparing segmented copolymers which comprises bringing together and reacting in an organic solvent therefor between about —20° C. and 150° C. (1) an organic solvent-soluble copolymer of (a) methyl methacrylate and (b) an isocyanatoalkyl methacrylate having two to four carbon atoms in the alkyl portion thereof, said copolymer having a plurality of isocyanato groups, and (2) an organic solvent-soluble polymer of styrene, said polymer having polymeric molecules each terminated by one basic —$NH_2$ group, the ratio of —$NH_2$ groups to isocyanato groups being from about 1:1 to about 1:2.

7. A process for preparing segmented copolymers which comprises bringing together and reacting between about —20° C. and about 150° C. (1) an organic solvent-soluble copolymer of (a) an isocyanatoalkyl vinyl ether and (b) a different polymerizable monovinylidene compound, said copolymer carrying a plurality of isocyanato groups, and (2) an organic solvent-soluble polymer of styrene, said polymer having polymeric molecules each terminated by one basic —$NH_2$ group, the ratio of —$NH_2$ groups to isocyanato groups being from about 1:1 to about 1:2.

8. A segmented copolymer prepared according to the process of claim 7.

9. A process for preparing segmented copolymers which comprises bringing together and reacting between about —20° C. and about 150° C. in an organic solvent therefor (1) an organic solvent-soluble copolymer of (a) an isocyanatoalkyl vinyl ether and (b) 2-ethylhexyl acrylate, said copolymer carrying a plurality of isocyanato groups, and (2) an organic solvent-soluble polymer of styrene, said polymer having polymeric molecules each terminated by one basic —$NH_2$ group, the ratio of —$NH_2$ groups to isocyanato groups being from about 1:1 to about 1:2.

10. A process according to claim 9, wherein the isocyanatoalkyl vinyl ether is isocyanatoisobutyl vinyl ether.

References Cited in the file of this patent

UNITED STATES PATENTS 2,647,884    Wystrach    Aug. 4, 1953